(12) United States Patent
Mizushima et al.

(10) Patent No.: US 7,926,950 B2
(45) Date of Patent: Apr. 19, 2011

(54) LASER IMAGE DISPLAY DEVICE AND COLOR IMAGE DISPLAY METHOD UTILIZING CONTROL OF THE POWER OF PLURAL LASER BEAMS TO DISPLAY A PIXEL

(75) Inventors: Tetsuro Mizushima, Osaka (JP); Ken'ichi Kasazumi, Osaka (JP); Akihiro Morikawa, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 11/916,235

(22) PCT Filed: May 29, 2006

(86) PCT No.: PCT/JP2006/310682
§ 371 (c)(1),
(2), (4) Date: Nov. 30, 2007

(87) PCT Pub. No.: WO2006/129611
PCT Pub. Date: Dec. 7, 2006

(65) Prior Publication Data
US 2009/0323026 A1    Dec. 31, 2009

(30) Foreign Application Priority Data
May 30, 2005    (JP) ................................. 2005-156784

(51) Int. Cl.
*G03B 21/00*    (2006.01)
*G09G 5/02*    (2006.01)
(52) U.S. Cl. .......................................... 353/31; 345/590
(58) Field of Classification Search ..................... 353/31; 345/590, 591
See application file for complete search history.

(56) References Cited

U.S. PATENT DOCUMENTS
5,440,352 A * 8/1995 Deter et al. .................... 348/750
(Continued)

FOREIGN PATENT DOCUMENTS
JP    10-293268    11/1998
(Continued)

OTHER PUBLICATIONS
International Preliminary Report on Patentability issued Dec. 21, 2007 in the International (PCT) Application No. PCT/JP2006/310682.
(Continued)

*Primary Examiner* — Thanh X Luu
(74) *Attorney, Agent, or Firm* — Wenderoth, Lind & Ponack, L.L.P.

(57) ABSTRACT

A laser image display device includes: a first laser light source capable of outputting a laser light having a first wavelength; a second laser light source capable of outputting a laser light having a second wavelength; and a color output conversion controller capable of individually controlling power of the first and the second laser light source displaying the pixels constituting an image according to an input signal. When an input signal is contained at the end point of the color reproducible region and the laser light having the first wavelength is driven substantially by a first maximum power while the laser light having the second wavelength is driven substantially by a second minimum power, the color output conversion controller displays in pixels, a color contained in the color reproducible region excluding the end point in the pixels by using the laser light of the first wavelength at a first power below the first maximum power and the laser light of the second wavelength at a second power above the second minimum power.

11 Claims, 6 Drawing Sheets

U.S. PATENT DOCUMENTS

| | | | |
|---|---|---|---|
| 6,144,352 A | 11/2000 | Matsuda et al. | |
| 7,408,558 B2 * | 8/2008 | Madden et al. | 345/590 |
| 2004/0036668 A1 | 2/2004 | Nakanishi | |

FOREIGN PATENT DOCUMENTS

| | | |
|---|---|---|
| JP | 10-319911 | 12/1998 |
| JP | 2001-318651 | 11/2001 |
| JP | 2002-244626 | 8/2002 |
| JP | 2002-372953 | 12/2002 |
| JP | 2003-280607 | 10/2003 |
| JP | 2004-140800 | 5/2004 |

OTHER PUBLICATIONS

International Search Report issued Jun. 20, 2006 in the International Application No. PCT/JP2006/310682.

* cited by examiner

| CONDITION | DISPLAY OUTPUT POWER | | | CHROMATICITY COORDINATE | | UNCOMFORTABLE FEELING | VIVIDNESS |
|---|---|---|---|---|---|---|---|
| | Blue/Red | Green/Red | (B+G)/R | Xr | Yr | | |
| 0 | 0.0053 | 0.0025 | 0.00775 | 0.706 | 0.281 | 0 | 20 |
| 1 | 0.0035 | 0.0028 | 0.00625 | 0.710 | 0.281 | 1 | 20 |
| 2 | 0.0088 | 0.0041 | 0.012875 | 0.699 | 0.279 | 0 | 20 |
| 3 | 0.0051 | 0.0102 | 0.015287 | 0.699 | 0.287 | 0 | 16 |
| 4 | 0.0300 | 0.0038 | 0.03375 | 0.667 | 0.262 | 0 | 3 |
| 5 | 0.0010 | 0.0411 | 0.042128 | 0.682 | 0.312 | 0 | 2 |
| 6 | 0.0009 | 0.0013 | 0.002209 | 0.714 | 0.283 | 9 | 20 |
| 7 | 0.0017 | 0.0027 | 0.004444 | 0.712 | 0.284 | 8 | 20 |

LASER IMAGE DISPLAY DEVICE AND COLOR IMAGE DISPLAY METHOD UTILIZING CONTROL OF THE POWER OF PLURAL LASER BEAMS TO DISPLAY A PIXEL

TECHNICAL FIELD

The present invention relates to an image display apparatus and an image display method. Particularly, the present invention relates to a laser image display device in which a laser light source is used as a light source to form an image, and a method for displaying a color image using the laser image display device.

BACKGROUND ART

Currently, various types of image display apparatus become widespread. A projection display method in which the modulated light emitted from the light source is projected onto a screen to display the image exists in such image display methods adopted in the various types of image display apparatus. Conventionally, a lamp light source is used as the light source of the image display apparatus in which the projection display method is adopted. However, the lamp light source has problems such as a short lifetime, a restricted color reproducible region, and low light use efficiency.

In order to solve the problems of the lamp light source, use of a laser light source is recently attempted for the light source of the projection display. In the present invention, the image display apparatus in which the laser light source is used as the light source is referred to as a laser image display device, and similarly the image display screen in which the laser light source is used as the light source is referred to as a laser image display screen. Compared with the lamp light source, the laser light source of the laser image display device has the longer lifetime, and the light use efficiency is easily improved because of strong directional characteristics possessed by the laser beam. The laser beam emitted from the laser light source has excellent monochromaticity, and a color reproducible region can be enlarged to vividly display the image compared with the lamp light source.

Figure 1:
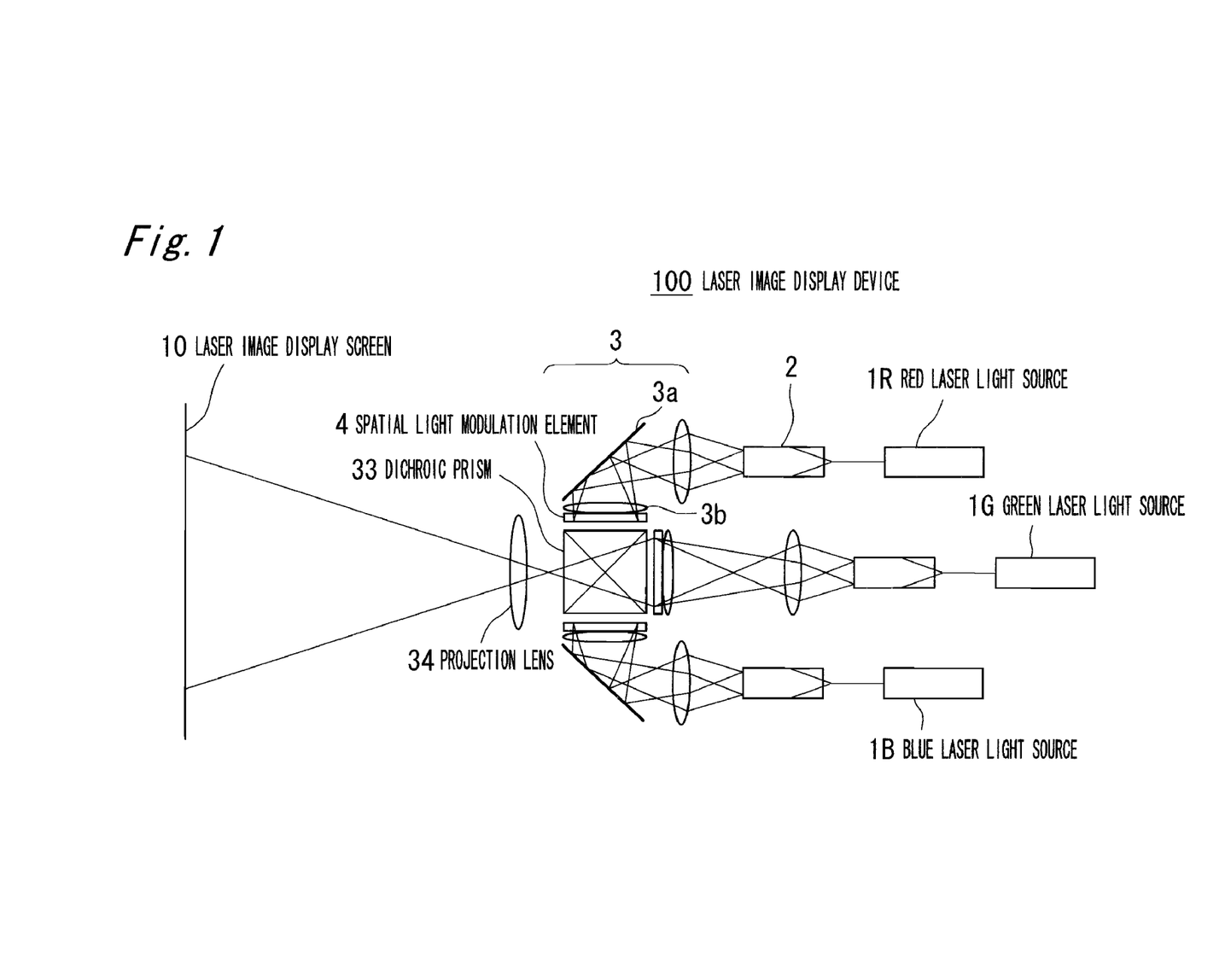
FIG. 1 is a schematic diagram of a configuration of a conventional laser image display device.

FIG. 1 is a schematic diagram of a configuration of a conventional laser image display device. In order to be able to display a color image, the laser image display device 100 includes three-color light sources having a red (R) laser light source 1R, a green (G) laser light source 1G, and a blue (B) laser light source 1B. The red, green, and blue laser beams emitted from the laser light sources 1R, 1G, and 1B are guided to and transmitted through an optical integrator 2. In the laser beam outgoing from the optical integrator 2, a light intensity distribution has a substantially even rectangular section. After the laser beam passes through an illumination optical system 3 (such as a relay lens, a mirror 3a, and a field lens 3b), the laser beam is incident to a spatial light modulation element 4. The spatial light modulation element 4 modulates the laser beam so as to form a two-dimensional image. The modulated red, green, and blue laser beams are multiplexed by a dichroic prism 33 and projected onto a screen 10 through a projection lens 34, and a full-color two-dimensional image is formed on the screen 10.

For years, as to the full-color two-dimensional image displaying with such laser image display device, many proposals are made to enlarge the color reproducible region. For example, Patent Document 1 (JP No. 10-293268 A) proposes a method for enlarging the color reproducible region by using the red laser beam having a wavelength of 625 to 635 nanometers and the blue laser beam having a wavelength of 455 to 465 nanometers as the wavelengths of the laser beams emitted from the laser light sources.

On the other hand, as to the color reproduction with the display apparatus, in order to ensure the broad color reproducible region as much as possible, when one of R (red), G (green), and B (blue) primary colors is displayed, conventionally the primary color is displayed by using a color corresponding to vertices of a polygon (triangle) formed by the color reproducible region possessed by the display apparatus in an xy chromaticity diagram.

Similarly, in the laser image display device, when one of R (red), G (green), and B (blue) primary colors is displayed, it is thought that the broad color reproducible region is effectively utilized by displaying the primary color using the color corresponding to the vertex of the polygon (triangle) formed by the color reproducible region in the xy chromaticity diagram.

Thus, in the laser image display device, the color reproducible region can be enlarged by utilizing characteristics of the laser light source which is of the light source of the laser image display device. However, in the full-color image display with the laser image display device having the enlarged color reproducible region, there are few proposals concerning a method for improving quality of displayed image.

Patent Document 1: JP No. 10-293268 A

DISCLOSURE OF INVENTION

Problem to be Solved by the Invention

In the image display of the image display apparatus with the monochromatic light source (for example, the laser light source) emitting the light having narrow spectrum, the invention provides an image display apparatus (for example, the laser image display device) which ensures the color reproducible region broader than the color reproducible region of the image display of the image display apparatus with the light source (for example, lamp light source) emitting the light having relatively broad spectrum and realizes the natural colors favorable for viewers in the display image, and a color image display method in which the image display apparatus is used.

Means for Solving Problem

According to an aspect of the present invention, a laser image display device includes: a first laser light source which can emit a first laser beam having a first wavelength; a second laser light source which can emit a second laser beam having a second wavelength; and a color output conversion controller which can control powers of the first and second laser beams based on an input signal, the first and second laser beams displaying a pixel constituting an image. The color output conversion controller can control the power of the first laser beam displaying the pixel between a first minimum power and a first maximum power, the color output conversion controller can control the power of the second laser beam displaying the pixel between a second minimum power and a second maximum power. When the input signal indicates an end point of a color reproducible region of the laser image display device with respect to display of the pixel, the end point of the color reproducible region being able to be displayed by substantially displaying the first laser beam with the first maximum power and by substantially displaying the second laser beam with the second minimum power, the color output conversion controller controls the powers of the first and second laser beams such that the pixel is displayed by the first laser beam having a first power less than or equal to the first maximum power and the second laser beam having a second power greater than the second minimum power so that the pixel displays a color which is included in the color reproducible region except for the end point.

According to the aspect of the present invention, the laser image display device further includes a third laser light source which can emit a third laser beam having a third wavelength. The first wavelength ranges from 620 to 700 nanometers. The second wavelength ranges from 500 to 550 nanometers. The third wavelength ranges from 430 to 470 nanometers. The color output conversion controller can control the power of the third laser beam displaying the pixel between a third minimum power and a third maximum power. When the input signal indicates an end point of the color reproducible region of the laser image display device with respect to display of the pixel, the end point of the color reproducible region being able to be displayed by substantially displaying the first laser beam with the first maximum power and by substantially displaying the second and third laser beams with the second and third minimum powers, the color output conversion controller controls the powers of the first, second, and third laser beams such that the pixel is displayed by the first laser beam having the first power and at least one of the second laser beam having the second power and the third beam having a third power greater than the third minimum power so that the pixel displays a color that is included in the color reproducible region except for the end point.

According to the aspect of the present invention, preferably, when the end point of the color reproducible region indicated by the input signal corresponds substantially to a red primary color, the color output conversion controller controls the powers of the first, second, and third laser beams such that the pixel is displayed by the first laser beam having the first power and at least one of the second laser beam having the second power and the third laser beam having the third power so that the pixel displays a color being formed by additive color mixture that is included in a range of $Xr>0.67$, $Yr<-1.5Xr+1.35$, and $Yr<0.31$ with respect to a chromaticity coordinate $(Xr,Yr)$.

According to the aspect of the present invention, preferably, the color output conversion controller controls the powers of the first, second, and third laser beams such that the total power of the second power and the third power displaying the pixel is greater than or equal to $1/200$ of the first power.

According to the aspect of the present invention, preferably, the second power is less than the third power.

According to the aspect of the present invention, preferably, the color output conversion controller controls at least one of the powers of the first, second, and third laser beams outputted from the first, second, and third laser light sources to control the powers of the first, second, and third laser beams being displayed on the pixel.

According to one aspect of the present invention, preferably, the image display apparatus further includes an optical modulation element which can modulate at least one of the first, second, and third laser beams, wherein the color output conversion controller controls the optical modulation element to control at least one of the powers of the first, second, and third laser beams being displayed on the pixel.

According to another aspect of the present invention, a method for displaying a color image using a laser image display device is provided. The laser image display device includes: a first laser light source which can emit a first laser beam having a first wavelength included in a range of 620 to 700 nanometers; a second laser light source which can emit a second laser beam having a second wavelength included in a range of 500 to 550 nanometers; a third laser light source which can emit a third laser beam having a third wavelength included in a range of 430 to 470 nanometers; and a color output conversion controller which can control powers of the first, second, and third laser beams based on an input signal, the first, second, and third laser beams displaying a pixel constituting an image. The color image displaying method includes: determining whether or not the input signal indicates that the pixel is to be displayed in red primary color; and displaying the pixel by the first laser beam having a first power and at least one of the second laser beam having a second power and the third laser beam having a third power if the determining determines that the input signal indicates that the pixel is to be displayed in red primary color. In the displaying, the color being displayed on the pixel is included in a range of $Xr>0.67$, $Yr<-1.5Xr+1.35$, and $Yr<0.31$ with respect to a chromaticity coordinate $(Xr,Yr)$, the color being formed by additive color mixture of the first laser beam having the first power and at least one of the second laser beam having the second power and the third laser beam having the third power.

According to the aspect of the present invention, preferably, the total power of the second power and the third power is greater than or equal to $1/200$ of the first power.

According to the aspect of the present invention, preferably, the second power is less than the third power.

EFFECT OF THE INVENTION

The image display apparatus and color image display method of the present invention has the color reproducible region broader than that of the conventional image display apparatus, and the image display apparatus and color image display method of the present invention can display the image having the favorable and natural colors for viewers.

EXPLANATIONS OF LETTERS OR NUMERALS 1R red laser light source
1G green laser light source
1B blue laser light source
2 optical integrator
3 illumination optical system
3a mirror
3b field lens
4 spatial light modulation element
10 laser image display screen
33 dichroic prism
34 projection lens
100 laser image display device
200 laser image display device
201R red laser light source 201G green laser light source
201B blue laser light source
203 laser light source output control unit
203R red laser light source drive unit
203G green laser light source drive unit
203B blue laser light source drive unit
204 spatial light modulation element
204C spatial light modulation element control unit
205 image signal input unit
207 color output conversion controller
208 near-primary color image output correction unit
208T color management table
208TC primary color expression correction table

BEST MODE FOR CARRYING OUT THE INVENTION

An exemplary embodiment of the present invention will be described below with reference to the drawings.

Figure 2:
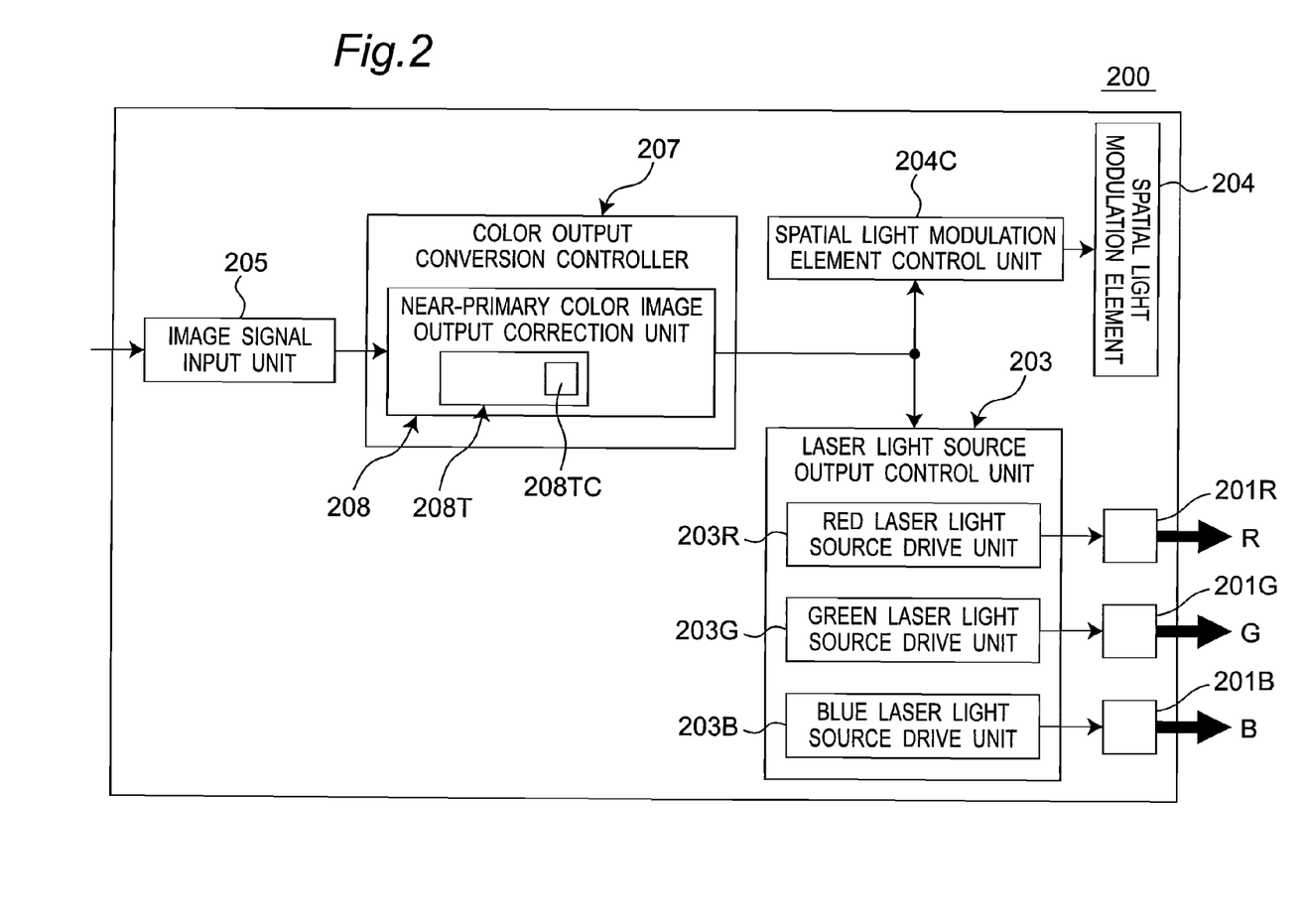
FIG. 2 is a block diagram of a laser image display device according to the present invention.

FIG. 2 is a block diagram of a laser image display device 200 according to an embodiment of the present invention. The laser image display device 200 includes an image signal input unit 205 which receives an image input signal (input signal) from outside, a color output conversion controller 207 which produces an output signal based on the image input signal (input signal), a spatial light modulation element control unit 204C which controls a spatial light modulation element 204 based on the output signal, the spatial light modulation element 204 which modulates a laser beam emitted from a light source, a laser light source output control unit 203 which controls laser light sources 201R, 201G, and 201B based on the output signal, the red (R) laser light source 201R, the green (G) laser light source 201G, and the blue (B) laser light source 201B.

The color output conversion controller 207 includes a near-primary color image output correction unit 208. The near-primary color image output correction unit 208 includes a color management table 208T which converts the image input signal (input signal) to obtain the output signal. The color management table 208T includes a primary color expression correction table 208TC in part of it.

The laser light source output control unit 203 includes a red laser light source drive unit 203R which drives and controls the red laser light source 201R, a green laser light source drive unit 203G which drives and controls the green laser light source 201G, and a blue laser light source drive unit 203B which drives and controls the blue laser light source 201B.

Thus, the laser image display device 200 includes the three-color laser light sources corresponding to RGB and the spatial light modulation element, which allows the color image to be displayed. Desirably, the red laser light source 201R emits the laser beam having a wavelength of 620 to 700 nanometers, the green laser light source 201G emits the laser beam having a wavelength of 500 to 550 nanometers, and the blue laser light source 201B emits the laser beam having a wavelength of 400 to 470 nanometers. In such cases, the laser image display device 200 can obtain the broad color reproducible region.

In the embodiment, the red laser light source 201R is a semiconductor laser light source having a center wavelength of 638 nanometers, the green laser light source 201G is an SHG laser light source having a center wavelength of 525 nanometers, and the blue laser light source 201B is a semiconductor laser light source having a center wavelength of 454 nanometers.

As to the illumination optical system which illuminates the spatial light modulation element with the light emitted from the light source and the projection optical system which project the light modulated by the spatial light modulation element to the screen (display surface), the laser image display device 200 has the similar configuration as that of those of the conventional laser image display device 100 (see FIG. 1). The laser image display device 200 displays a color image by an integral additive color process in which the R, G, and B colors are spatially modulated and mixed on the screen (display surface). The laser image display device 200 has modulation contrast capability of 500:1 for each of the R, G, and B colors, and white is displayed on the screen when all the R, G, and B colors are set to the maximum output. On the contrary, the laser image display device 200 sets all the R, G, and B colors to minimum outputs when black is displayed on the screen. At this point, the laser image display device 200 performs the output of $1/500$ for each of the R, G, and B colors as compared to a case of the white is displayed on the screen.

The powers for displaying one pixel of the screen using three colors of R, G, and B laser light sources 201R, 201G, and 201B and spatial light modulation element 204 of the laser image display device 200 is as follows. The maximum powers in the maximum outputs (for displaying White (W)) are as follow:
Red (R): 815 nW,
Green (G): 540 nW,
Blue (B): 355 nW.
The minimum powers in the minimum outputs (for displaying Black (Bk)) are as follow:
Red (R): 1.6 nW,
Green (G): 1.1 nW,
Blue (B): 0.7 nW.
The power for displaying the colors in the laser image display device 200 is modulated by changing the output powers of the laser light sources 201R, 201G, and 201B. Additionally, the power may also be modulated by controlling the spatial light modulation element 204 to change light quantities of laser beams concerning the display of the color.

The color-reproducible xy chromaticity coordinates for each of R, G, and B colors of the laser image display device 200 are as follows:
Red (R): (0.714, 0.283),
Green (G): (0.116, 0.823),
Blue (B): (0.153, 0.023).
Each of the above colors are achieved by the spatial light modulation element 204 and by changing at least one of the output powers of the laser light sources 201R, 201G, and 201B such that the output power concerning the color is set to the maximum power while the output powers concerning other two colors are set to the minimum power. The spatial light modulation element 204 is not limited to the transmission type modulation element, but a reflection type modulation element may be used. In later case, the light quantity can be controlled by changing the light quantity which is reflected and outputted from the reflection type modulation element.

Figure 3A:
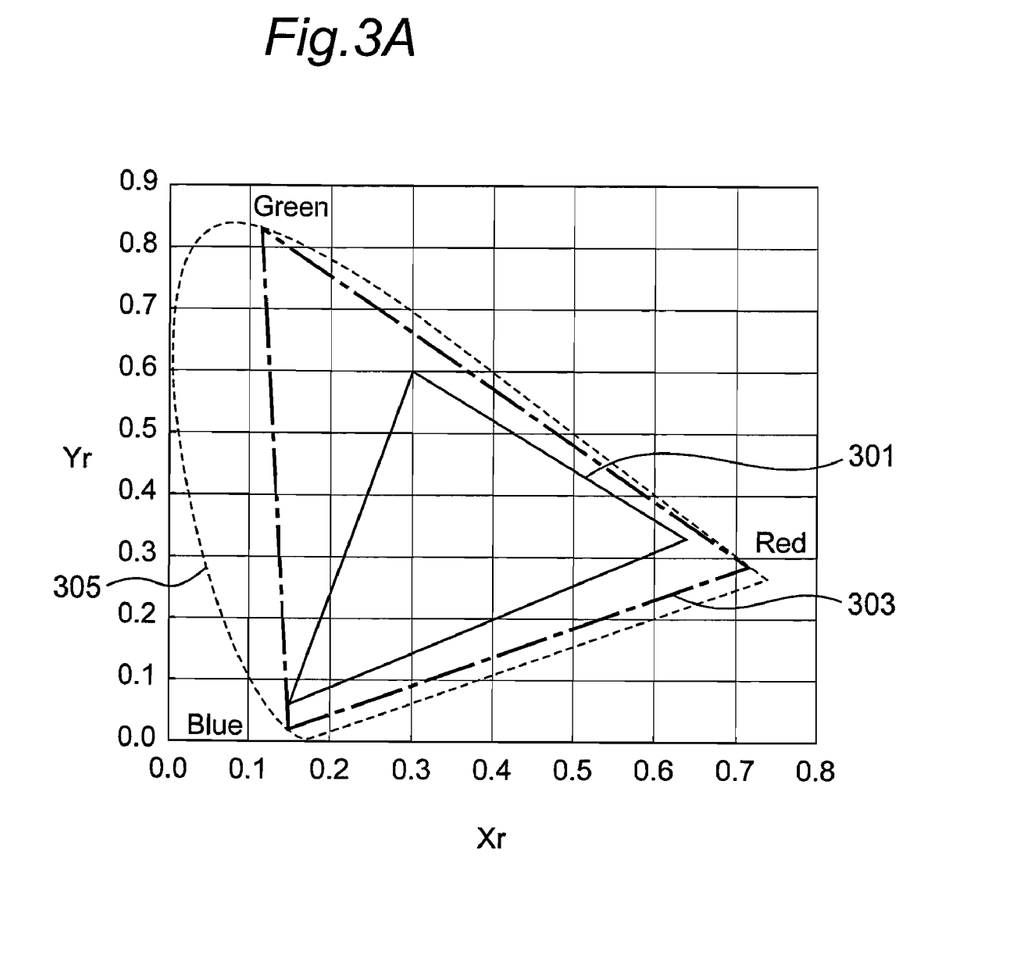
FIG. 3A is a CIExy chromaticity diagram for a color reproducible region of the laser image display device according to the present invention.

FIG. 3A is a diagram of the color reproducible region of the laser image display device 200 of the embodiment as a CIExy chromaticity diagram. In FIG. 3A, the color reproducible region of the laser image display device 200 is a region 303 surrounded by an alternate long and short dash line. Generally, a laser light source is a light source having excellent monochromaticity. Therefore, laser image display device can obtain a broader color reproducible region by properly selecting the wavelengths of the laser beams used as compared with the conventional display apparatus. Three vertices of the triangle constituting the region 303 coincide with the above-described chromaticity coordinates (0.714, 0.283), (0.116, 0.823), and (0.153, 0.023).

For the purpose of comparison, the conventional CRT color reproducible region (sRGB standard) is shown as a region 301 surrounded by a solid line. The color reproducible region 303 of the laser image display device 200 of the embodiment completely includes a color reproducible region 301 of the sRGB standard, and the color reproducible region 303 has a 205% area in the CIExy chromaticity diagram as compared to the color reproducible region 301 of the sRGB standard.

As described above, in the color reproduction of the laser display apparatus, the primary purpose is to ensure the color reproducible region as broad as possible. Therefore, in the case where an input signal indicates any one of the R, G, and B primary colors, the primary color (R, G, or B) is displayed by using the color corresponding to the vertex of the triangle of the color reproducible region 303 to achieve the effective use of the broad color reproducible region.

However, the inventors of the present application thinks it is necessary that, in the laser image display device having the sufficiently broad color reproducible region, color representation which the viewer recognizes as a natural color be realized irrespective of the utilization of the whole of the broad color reproducible region. In order to realize the natural color representation for the viewer, it is necessary that color-sense characteristics of a human be considered in providing a color representation method. The present invention is made as a result of this inventors' thought. The present invention relates to a laser image display device and a color image display method on the basis of the color-sense characteristics of the human. The invention steps up the progress of the technical innovation to a new stage in the laser image display device.

In the first place, the laser light source is an excitation light source having an extremely narrow spectrum. People normally hardly see such light having the extremely-narrow spectrum characteristics. The human being tends to sense an uncomfortable feeling against the monochromatic light. Therefore, sometimes the human senses the uncomfortable feeling when viewing the light emitted from only one of the R, G, and B laser light sources. The "light emitted from only one of the R, G, and B laser light sources" is just the light which the viewer sees in the conventional laser image display device when the input signal indicates one of the R (red), G (green), and B (blue) primary colors. The present invention focuses attention on this point, and the primary color representation is realized such that the viewer does not sense such uncomfortable feeling. As used herein, the "primary color" shall mean the red color, the green color, the blue color, and a color close to these three colors in the chromaticity diagram.

Particularly, only one kind of a visual cell of the human is mainly stimulated to recognize the color for the light having the wavelength longer than 620 nanometers. In the case where the light having the wavelength less than or equal to 620 nanometers does not exists in it is incident to a pupil of a human, visual cells other than the one kind of the visual cell are not stimulated, and the stimulations received by different visual cells cannot be compared to one another. Therefore, the human easily senses the uncomfortable feeling. In order to bring the status of the stimulation to visual cells of the human close to a status of stimulation to visual cells normally undergone in the real world, the primary colors are preferably expressed using outputs from the laser light sources of the other colors even if the input signal indicates the primary color such as the red color, green color, and blue color.

In the laser image display device 200 of the embodiment according to the present invention, even if the input signal indicates one of the Red, Green, and Blue primary colors, an output(s) from at least one of the laser light sources of colors other than the primary color indicated by the input signal is added to the output from the laser light source of the color corresponding to the primary color indicated by the input signal so that the primary color indicated by the input signal is displayed. The uncomfortable feeling sensed by the viewer is reduced when the light in which the light of the laser light source corresponding to the primary color indicated by the input signal and the light of the laser light source having the different color are mixed together is provided to the viewer.

Figure 3B:
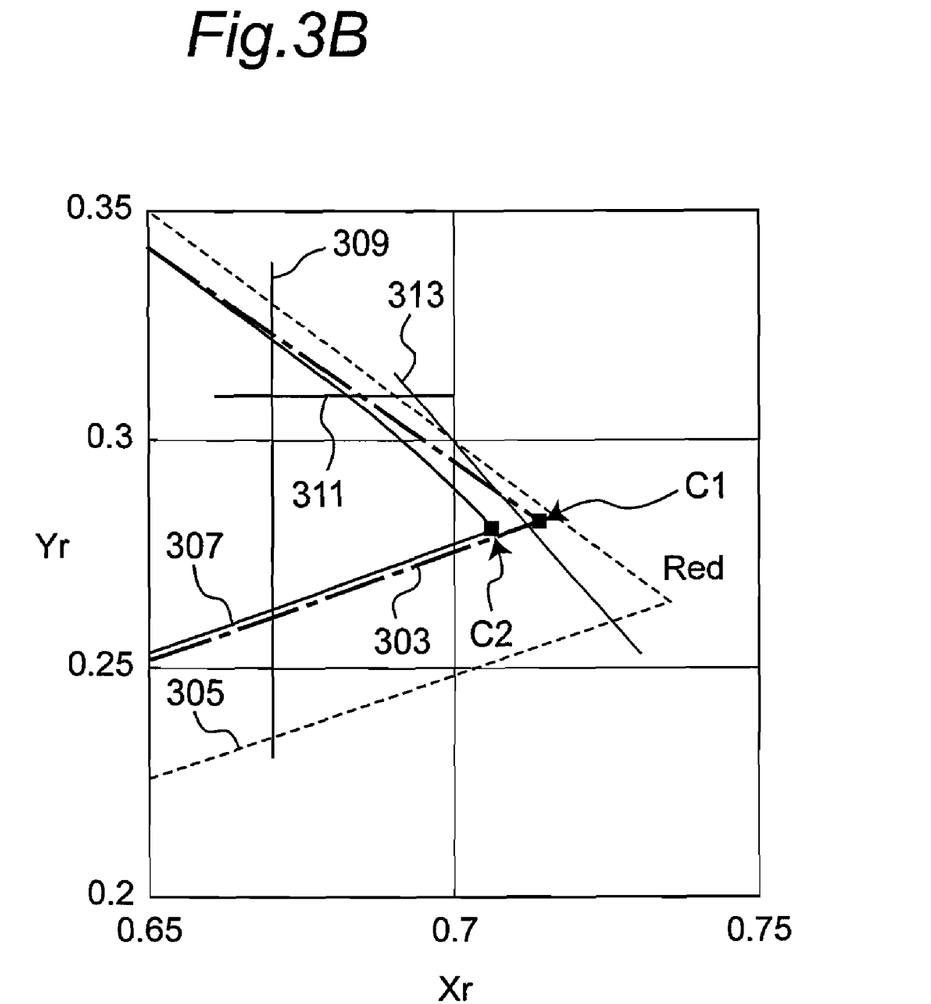
FIG. 3B is a partially enlarged view of FIG. 3A.

FIG. 3B is a partially enlarged view of FIG. 3A. In FIG. 3B, the region of $0.65 \leq Xr \leq 0.75$ and $0.2 \leq Yr \leq 0.35$ is extracted from FIG. 3A and enlarged. The region shown in FIG. 3B includes red color. A primary color display method in the laser image display device 200 will be described with reference to FIG. 3B.

Here, although the primary color display method is described only for red color, the invention may also be applied to display other primary colors (green and blue). Because the effect of the invention appears significantly especially in the display of the red primary color, the red primary color display method is described by way of example.

Figure 4:
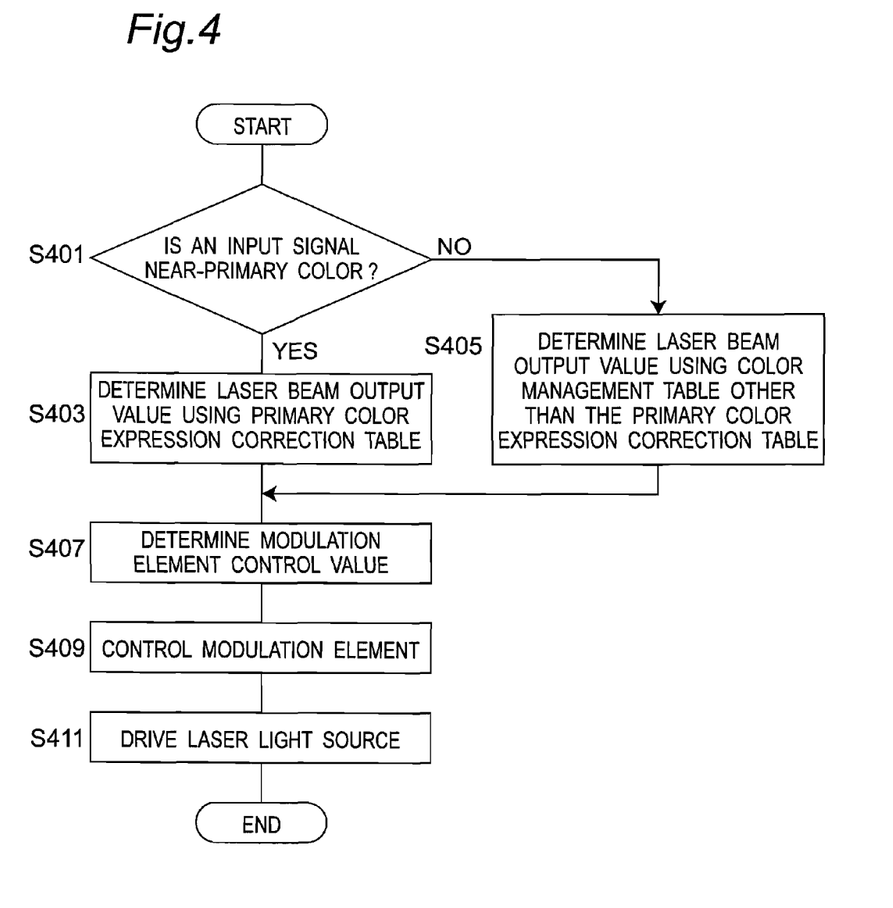
FIG. 4 is a flowchart of the color image display according to the present invention.

FIG. 4 is a flowchart of the color image display method according to the embodiment of the present invention. With reference to FIG. 4 together with FIGS. 2 and 3B, the primary color display method will be described.

In the laser image display device 200, the signal including information about the color displayed in one pixel on the screen, i.e., image input signal is inputted to the image signal input unit 205. The inputted image input signal is transmitted to the color output conversion controller 207 as an input signal.

The color output conversion controller 207 has a function of converting the input signal into an output signal used to drive and control the spatial light modulation element 204 and the laser light sources 201R, 201G, and 201B. The effect of the present invention is realized by the near-primary color image output correction unit 208 included in the color output conversion controller 207. The conversion which the color output conversion controller 207 performs can be performed with referring to a table included in the near-primary color image output correction unit 208. In the present invention, the table is referred to as a color management table designated by the numeral 208T in FIG. 2.

When the near-primary color image output correction unit 208 of the color output conversion controller 207 receives the input signal, the near-primary color image output correction unit 208 determines whether or not the color indicated by the input signal is a "near-primary color" (Step S401). As used herein, the "near-primary color" shall include a primary color and a color included within a predetermined range from the primary color in the xy chromaticity diagram. The "input signal indicates the primary color" shall mean the case in which an brightness signals for RGB three colors included in the input signal are at its maximum for only one color of the RGB while the brightness signals are at their minimum for other two colors. For example, when the input signal is represented by three 8-bit components of RGB, the primary color of red is represented by (R,G,B)=(255,0,0). The determination whether or not the input signal indicates the near-primary color can be made by providing a criterion whether both of ratios of the component having largest brightness signal among the three components to other two components are greater than or equal to a predetermined value or not.

When the input signal indicates the near-primary color ("YES" in Step S401), the near-primary color image output correction unit 208 converts the input signal into the output signal using the primary color expression correction table 208TC included in the color management table 208T (Step S403).

The signal conversion with the primary color expression correction table 208TC will be described in detail later.

When the input signal does not indicate the near-primary color ("NO" in Step S401), the near-primary color image output correction unit 208 converts the input signal into the output signal using a normal table (a table being different from the primary color expression correction table 208TC) included in the color management table 208T (Step S403). The normal table may be a signal conversion table employing a conventional technique.

The color output conversion controller 207 transmits the output signal being generated in the near-primary color image output correction unit 208 to the spatial light modulation element control unit 204C and the laser light source output control unit 203. The spatial light modulation element control unit 204C which has received the output signal determines a modulation element control value based on the output signal (Step S407). And the spatial light modulation element control unit 204C drives and controls the spatial light modulation element 204 based on the modulation element control value (Step S409). The laser light source output control unit 203 which has received the output signal transmits a control signal to the red laser light source drive unit 203R, green laser light source drive unit 203G, and blue laser light source drive unit 203B based on the output signal. And the laser light source drive units 203R, 203G, and 203B drive the laser light sources 201R, 201G, and 201B respectively (Step S411).

The signal conversion with the primary color expression correction table 208TC in Step S403 of FIG. 4 will be described in detail.

The primary color expression correction table 208TC is a reference table having a value corresponding to the input signal, and particularly, the values corresponding to the input signal which indicates the near-primary color.

The primary color expression correction table 208TC is referred to and used to derive the output signal when the input signal indicates the near-primary color.

The signal conversion with the primary color expression correction table 208TC will be described in the case where the input signal indicates the red primary color by way of example. The input signal which indicates the red primary color is represented as (R,G,B)=(255,0,0) in the case where each of the RGB components is represented by 8-bit gradation sequence. Usually, when the signal like (R,G,B)=(255, 0,0) is received, an image display apparatus expresses the red primary color by setting the red light beam to its maximum output power and the green and blue light beams to their minimum output powers, respectively. On the contrary, in the embodiment, the input signal is converted into the output signal using the primary color expression correction table 208TC. The output signal is the output signal which lets each light from laser light sources 201R, 201G, and 201B be displayed with: the output power from the red laser light source 201R being equal to its maximum output power or a power which is lower than the maximum output power by a predetermined amount; and with at least one of the output powers from the green and blue laser light sources 201G and 201B being a power which is higher than their minimum output powers by a predetermined amount. As used herein, the maximum output power shall mean the output power of the light when white is displayed, and the minimum output power shall mean the output power of the light when black is displayed.

In the laser image display device 200, when the red laser beam is displayed with the maximum power while the green and blue laser beams are displayed with the minimum powers, the color having the xy chromaticity coordinate (0.714, 0.283) is displayed on the screen. This color corresponds to the vertex in the red region of the color reproducible region 303 (red region end point of the color reproducible region 303). In FIG. 3B, a coordinate point C1 indicates this xy chromaticity coordinate (0.714, 0.283). However, the laser image display device 200 actually displays the color corresponding to a coordinate point C2 as the red primary color with utilizing the primary color expression correction table 208TC. The coordinate point C2 has the xy chromaticity coordinate (0.706, 0.281). The powers of three laser beams necessary to display the one pixel on the screen are as follows:

Red (R) power: 800 nW,
Green (G) power: 2 nW,
Blue (B) power: 4.2 nW.

Thus, the primary color expression correction table 208TC is the reference table in which the input signal can be converted such that the colors included in the vertices of the polygon (triangle) formed by the color reproducible region 303 (end points of the color reproducible region), sides near the vertices (end points), and the range being close to the vertices (end points) or the sides near the vertices (end points) within the color reproducible region 303 in the chromaticity diagram are not used for the color displaying. Therefore, the actual color representation region of the laser image display device 200 becomes a narrowed color reproducible region 307 included in the region shown as the color reproducible region 303. However, the laser image display device 200 has the significantly broad color reproducible region 303, and the narrowed color reproducible region 307 is slightly narrowed, so that there is no trouble when the laser image display device functions as the image display apparatus.

The reason why the red laser beam power is set to a level lower than the maximum output power in displaying the red primary color is that the brightness of the displayed red primary color be balanced with brightness of a color being displayed when the input signal indicates a medium tone being close to the red primary color. When it is intended only to display the red primary color without giving the uncomfortable feeling to the viewer, the red laser beam power may be the maximum output power.

In the primary color expression correction table 208TC, the signal conversion is performed for the input signal indicating the red near-primary color similarly such that at least one of the outputs of the blue and green laser beams be larger than their minimum powers. Therefore, in the laser image display device 200, when the red primary color or the red near-primary color is displayed, the color is not displayed only with the laser beam output from the red laser light source 201R, and hence, the viewer does not sense the uncomfortable feeling due to the existence of the laser beam output of another color.

The color reproducible region (narrowed color reproducible region 307) used in the displaying of an image is smoothly connected in the entire peripheral region. This is due to the use of the primary color expression correction table 208TC which is made up in consideration for not only the case where the input signal indicates the primary color but also the case where the input signal indicates the near-primary color. FIG. 3B shows the red near-primary color region of the narrowed color reproducible region 307. The narrowed color reproducible region 307 also has the smooth peripheral regions in the green and blue near-primary colors region.

The chromaticity coordinate value used in displaying the red primary color with the primary color expression correction table 208TC is moved to the coordinate point C2 inside the color reproducible region 303 from the coordinate point C1 of the vertex used when the color reproducible region 303 is to be maximally utilized. Hence, the chromaticity coordinate value used in displaying the near-primary color is also changed from the coordinate value of the color used when the color reproducible region 303 is to be maximally utilized. Accordingly, the laser image display device 200 displays an image using only the colors included in the narrowed color reproducible region 307. As a result, even if the primary color or the near-primary color is displayed, the laser beams having the powers larger than the minimum output powers are emitted from at least two of the laser light sources of the three primary colors (RGB) and all the pixels of an image are displayed by light exhibiting a spectrum characteristic having a plurality of peaks. This enables the laser image display device 200 to provide an image in which the viewer senses no uncomfortable feeling. The narrowed color reproducible region 307 includes entire conventional color reproducible regions such as sRGB, and the region 307 is dramatically enlarged compared with the conventional color reproducible region, so that the viewer can enjoy the natural and vivid image.

In the embodiment, a laser light source which can emit light having a wavelength longer than 620 nanometers is preferably used as the red laser light source 201R. This enables the y value (coordinate value of a vertical axis Yr in FIGS. 3A and 3B) to be decreased in the chromaticity diagram of the color used to display the red primary color, and the red having high chroma saturation which has not been conventionally displayed can be represented. Specifically, for a red surface color (5R3), the laser image display device of the present embodiment can represent the color up to chroma saturation 16 (highest value defined by JIS (Japanese Industrial Standards)) while the conventional display apparatus can represent that color only up to chroma saturation 11.

In the case where the input signal indicates the red primary color, preferably the primary color expression correction table 208TC is defined such that the total of the green and blue laser beam powers, i.e., the total of the powers other than the red laser beam power for one pixel of the screen which concerns the red primary color displaying is greater than or equal to $1/200$ of the red laser beam power. Also in the case where the color which is not included in the primary color or the near-primary color is displayed, more preferably the color management table 208T is defined such that the total of the powers other than the red laser beam power for one pixel of the screen which concerns the displaying of the color, i.e., the total power of the green and blue laser beam powers is always greater than or equal to $1/200$ of the red laser beam power. Color of each pixel is always displayed while the laser beam powers other than the red laser beam power are greater than or equal to the above-described power and it never happens that the particular one kind of visual cell is solely stimulated only by the red laser beam so that the image can be displayed in which a viewer does not sense the uncomfortable feeling. For medium tone colors, as described above, the laser beams from the light sources other than the red laser light source 201R, i.e., the laser light sources 201G and 201B are included, so that the natural image can be provided to the viewer by adjusting the chromaticity.

In the laser image display device 200 of the embodiment, when the red primary color is displayed, the red laser beam power from the red laser light source 201R is set to 800 nW and the green and blue laser beam powers of the green and blue laser light sources 201G and 201B are set to 6.2 nW in total. That is, the primary color expression correction table 208TC is defined such that the powers satisfying a relationship of (red laser beam power/200)≦(green laser beam power+blue laser beam power) are displayed in one pixel on the screen. In the case where the color other than the primary color and the near-primary color is displayed, the primary color expression correction table 208TC is also defined such that the powers satisfying a relationship of (red laser beam power/200)≦(green laser beam power+blue laser beam power) are displayed in one pixel on the screen. If the laser beam powers from the three light sources satisfy the above-described relationship, at least two kinds of visual cells can always be stimulated in displaying the color with the laser light source having the wavelength longer than 620 nm, and the image in which the viewer senses no uncomfortable feeling can be provided to the viewer. In the above-described relationship, the coefficient of "$1/200$" is a value based on experiments performed by the inventors. In the experiments, in the case where the total of the green laser beam power and blue laser beam power is lower than $1/200$ of the red laser beam power, a subject frequently senses the uncomfortable feeling. In the case where the red primary color is displayed, more preferably the primary color expression correction table 208TC is defined such that the powers of the laser beams from the light sources satisfying a relationship of ($1/30$)≧(green laser beam power+blue laser beam power)/(red laser beam power)≧($1/200$) are displayed in one pixel on the screen.

In the case where the input signal indicates the red primary color, desirably the primary color expression correction table 208TC is defined such that, as to the pixel affected by the laser beam powers from the green and blue laser light sources 201G and 201B, the blue laser beam power from the blue laser light source 201B is greater than the green laser beam power from the green laser light source 201G. More preferably, the blue laser beam power from the blue laser light source 201B is greater than 1.5 times of the green laser beam power from the green laser light source 201G, and further more preferably, the blue laser beam power from the blue laser light source 201B is greater than double of the green laser beam power from the green laser light source 201G.

This is attributed to the fact that a human senses certain non-spectrum color on red-violet as the unique color of red. It allows the chromaticity coordinate of the actually-displayed red primary color to be brought close to the above-described unique color of red when the display is performed with the output of the blue laser light source 201B, which is greater than the output of the green laser light source 201G, being added to the output of the red laser light source. Therefore, the viewer can regard the color actually displayed based on the input signal which indicates the red primary color as red color having high chroma saturation. As to this point, the medium tone colors being close to the red primary color are also displayed with the output from the light source other than the red laser light source 201R being added such that the chromaticity coordinate value of the medium tone colors are well matched with the chromaticity coordinate value being used to display the red primary color. The display of the color close to the unique color of red in the above-described approach can provide the vivid image to the viewer while the viewer does not sense that the color reproducible region (narrowed color reproducible region 307) actually used in the display becomes narrower than the color reproducible range 303. In the conventional display apparatus, the representation of the unique color of red cannot be considered because of the narrow color reproducible region. The above-described approach of the present embodiment is enabled because the enlarged color reproducible region is obtained in the laser image display device.

The features of the primary color displayed by the laser image display device 200, particularly of the red primary color will be described with reference to the xy chromaticity diagram. The laser image display device 200 displays a color actually as the red primary color, which is included within a range of $Xr>0.67$, $Yr<-1.5Xr+1.35$, and $Yr<0.31$ with respect to the chromaticity coordinate (Xr,Yr). FIG. 3B shows the above-described range. A straight line 309 is the line of $Xr=0.67$, a straight line 311 is the line of $Yr=0.31$, and a straight line 313 is the line of $Yr=-1.5Xr+1.35$. Therefore, in FIG. 3B, the above described range is the right side of the straight line 309 and the lower side of the straight line 311 and the lower side of the straight line 313.

The actually displayed color corresponding to the input signal indicating the red primary color is included within the range, so that the broad color display region and the image in which the viewer senses no uncomfortable feeling can be provided to the user. In the case where the chromaticity coordinate of the displayed color corresponding to the input signal indicating the red primary color is included in the range of $Xr \leq 067$ (left side of the straight line 309) or $Yr \geq 0.31$ (upper side of the straight line 311), only the color representation having the low chroma saturation can be performed like the conventional image display apparatus. This is because the chromaticity coordinates used to display other medium tone colors are sequentially determined based on the chromaticity coordinate used to display the primary color. In the case where the chromaticity coordinate of the actually displayed color corresponding to the input signal indicating the red primary color is included in the range of $Yr \geq -1.5Xr+1.35$ (upper side of the straight line 313), the actually displayed color includes only the light beams having wavelengths longer than or equal to 620 nm, and the viewer senses the uncomfortable feeling because only one kind of visual cells of the viewer is strongly stimulated by the displayed red primary color. In addition, the longer wavelength emitted from the light source is used as the red laser light source 201R, the more uncomfortable feeling sensed by the viewer more significantly appears. Therefore, in the case where the wavelength of the laser beam emitted from the red laser light source 201R is changed to the longer wavelength, desirably the primary color expression correction table 208TC is defined such that the peripheral region of the narrowed color reproducible region 307 is further narrowed toward inside (toward the left in FIG. 3B). The use of a color in the range of $Yr \geq -1.5Xr+1.35$ is desirably avoided even if the color corresponding to the input signal indicating the color other than the red primary color and red near-primary color is displayed. This is because the viewer strongly tends to sense the uncomfortable feeling for the color in the range of $Yr \geq -1.5Xr+1.35$.

In the case where the input signal indicates one of the Red, Green, and Blue primary colors, preferably the output power from the laser light sources 201R, 201G, or 201B with which the pixel corresponding to the input signal is displayed with the color corresponding to the (R, G, or B) primary color is lower than the output power used to display white. In the embodiment, when the color corresponding to the red primary color is displayed, the red laser beam power from the red laser light source 201R is set to 800 nW, and the red laser beam is outputted lower than the power of 815 nW used to display white. In the case of the use of the laser light source, the color having the high chroma saturation is seen brighter with respect to the display of the white. This phenomenon is easily caused when the R, G, and B primary colors are displayed. As mentioned, the R, G, and B primary colors are of the vertices (end points) of the color reproducible region and the chroma saturation becomes highest at the vertices (end points). Therefore, the power of the laser beam from the laser light source corresponding to the primary color is controlled to be low when the pixel is displayed based on the input signal indicating the primary color, whereby natural color displaying for a human can be achieved. In the case where a saturated color (pure color) (such as yellow and magenta) which corresponds to the side of the color reproducible region is displayed, preferably the display is also performed such that the output from the laser light source is kept to be low. For example, when the color is displayed based on the input signal of (R,G,B)=(255,0,255) indicating magenta, preferably the display is performed such that at least one of the laser beam powers from the red laser light source 201R and blue laser light source 201B is lower than those for displaying white. In the case where the output powers from the three light sources for displaying white are expressed as (red laser light source output power, green laser light source output power, blue laser light source output power)=(100%,100%,100%), the output powers from the three light sources for displaying magenta may be set to (99%,0%,99%). At this point, 0% shall mean the light source output power when black is displayed. This is effective because few colors which is bright and close to magenta and have high chroma saturation exist in the natural world. Alternatively, the light source power which is not used to display magenta may be added. For example, the output powers from the three light sources for displaying magenta are effectively set to (100%,1%,100%). Furthermore, both the techniques may be combined. The power of the laser beam in which a large output is required is kept lower than the power used to display white and the power of the laser beam whose output is not required may be set higher than the power used to display black. For example, for displaying magenta, the powers of the laser beams outputted from the three light sources to display the pixel may be set to (99%,1%,99%).

The present invention can be applied to a device other than the laser image display device. Particularly, the present invention can effectively applied to a display device having a broader chromaticity region than a chromaticity region for which an input signal is designed (sRGB, for example).

In order to represent colors such as a color close to the unique color of red, a red color of high chroma saturation, and a violet color of high chroma saturation while the broad color reproducible region is ensured, preferably the wavelengths of the laser beams emitted from the red laser light source 201R and blue laser light source 201B has the small y value in the xy chromaticity coordinate. For this reason, preferably the red laser light source 201R can emit the laser beam having the wavelength longer than 620 nm and the blue laser light source 201B can emit the laser beam having the wavelength shorter than 470 nm. This corresponds to the fact that, in terms of the xy chromaticity coordinate, the red laser light source 201R can emit the laser beam having the y value greater than 0.31 and the blue laser light source 201B can emit the laser beam having the y value less than 0.06. In order to ensure visual sensitivity, the red laser light source 201R can emit the laser beam having the wavelength between 620 to 700 nanometers, and the blue laser light source 201B can emit the laser beam having the wavelength between 430 to 470 nanometers. In order to display a color having the chromaticity of further smaller y value, more preferably the wavelength of the laser beam emitted from the red laser light source 201R may be included in the range of 630 to 700 nanometers and the wavelength of the laser beam emitted from the blue laser light source 201B may be included in the range of 430 to 455 nanometers. By using the laser light sources 201R and 201B which emit laser light having the above-described wavelengths and the green laser light source 201G, a red color of high chroma saturation and a violet color of high chroma saturation, which can not be represented conventionally, can be represented and hence the vivid and natural image can be provided to the viewer.

The color representation technique of the laser image display device can be performed by a program, which converts an input signal (an image input signal) into an output signal (an image output signal). Desirably, the program are installed in the laser image display device. In the laser image display device 200 of the present embodiment, the program is installed in the color output conversion controller 207 and the program is executed by the controller 207. According to the present invention, the program converts not only the image input signal indicating the red primary color but also the image input signal indicating the color close to the red primary color (near-primary color) into the output signal to realize the color representation suitable for the viewer. The input signal indicating the red primary color is converted into the output signal such that the laser beam output other than the laser beam output from the red laser light source 201R is added. Further, the image input signal indicating the medium tone color close to the red primary color is also converted into the output signal such that the laser beam output other than the laser beam output from the red laser light source 201R is added to match with the conversion of the input signal indicating the red primary color. In this case, the output of each light source for the pixel illuminated by the input signal indicating the red primary color and the chromaticity of the color realized by the illumination are also included in the above-described preferable range.

The program can simultaneously convert a chromaticity of the conventional video image input signal (specifically, the video image input signal pursuant to the sRGB standard, for example) into an output signal (image display signal) such that the viewer is provided with a suitable color representation. In the case where a video image input signal pursuant to the sRGB standard (conventional video image signal) is converted into the output signal, preferably, the displaying may be performed to fully utilize the color representation capability of the laser image display device 200 by using the color included in the chromaticity range (for example, the narrowed color reproducible region 307) which is broader than that of the conventional chromaticity range. As a matter of course, the conversion can be performed such that the color is displayed within the range of the conventional reference chromaticity (sRGB-standard color reproducible region 301 shown in FIG. 3A), although. At this point, the output signal (image display signal) may be converted such that the chromaticity range of the color display region of the present invention, i.e., the narrowed color reproducible region 307 is fully utilized. As described above, the chromaticity range of the color display region of the present invention is the chromaticity range defined such that, for example, in the case where the input signal indicates the red primary color, the chromaticity of the actually displayed color does not have the chromaticity indicating the light outputted only from the red laser light source 201R but the chromaticity indicating the light formed by adding the laser beam outputs from other laser light sources (green and blue laser light sources 201G and 201B). Preferably, the output power of each light source actually outputted based on the input signal indicating the red primary color and the chromaticity of the color formed by the mixture of the light beams of the light sources are included in the above-described range. The input signal indicating a medium tone color is converted into an output signal so as to be matched with the chromaticity of the light beam emitted based on the input signal indicating the primary color such as the red primary color and so as to become the representation suitable for the viewer.

Figure 5:
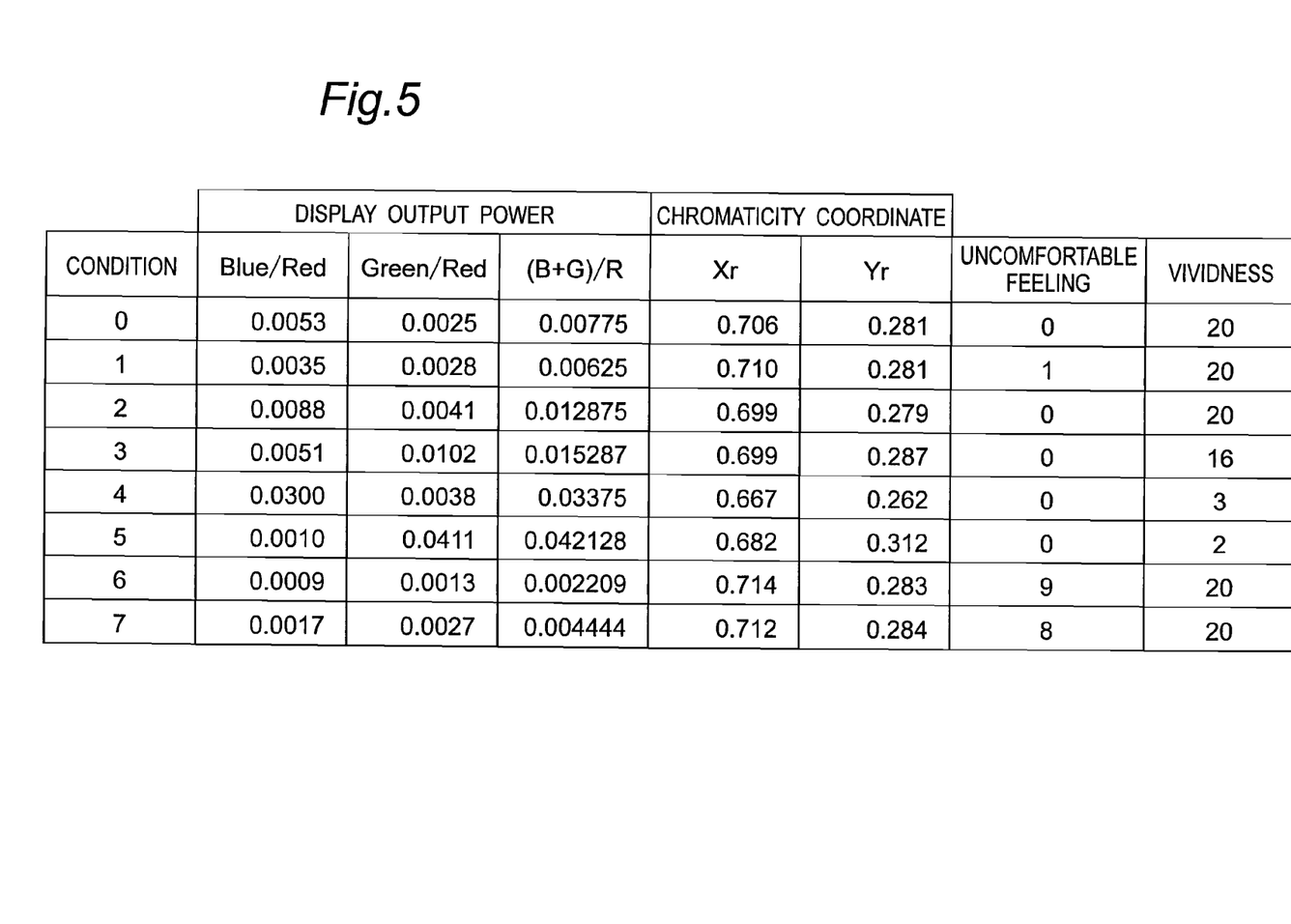
FIG. 5 is a diagram of an evaluation result of the color image displaying.

The inventors assessed the performance of the color display of the laser image display device 200 which has the color reproducible region 303 of FIG. 3A. FIG. 5 is a table of this assessment result. This assessment is operated as follows. Images of near-primary color is displayed using an input signal indicating red near-primary color, which is converted into the output signal in which predetermined amount of outputs from the blue and green laser light sources are included. The predetermined amount is determined from each condition. And subjects evaluate images of the near-primary color on uncomfortable feeling and vividness of the color. In addition, in the case where an input signal indicating red primary color is converted into an output signal, the outputs from the light sources other than the red laser light source 201R are added most. And the outputs from the light sources other than the red laser light source 201R added by the conversion are monotonously decreased as the color indicated by the input signal is distant away from the red primary color. Further, assessment using an input signal indicating medium tone color was also performed. The evaluation also was performed using the input signal indicating the medium tone. When the input signal indicating black or white is displayed, the above-described output power is set. For the red near-primary color, the plural types of input signals were prepared so as to represent several colors. Ten viewers (subjects) assessed plural images. FIG. 5 shows the ratios of output power from the light sources 201G and 201B other than the red laser light source 201R to red laser light source 201R when the image is displayed based on the input signal indicating the red primary color and the chromaticity of the color actually displayed corresponding to the red primary color and the viewer's evaluation.

The ten viewers evaluate the uncomfortable feeling with 0 (no uncomfortable feeling) or 1 (existence of uncomfortable feeling) and the ten viewers evaluate the vividness with 0 (same as before), 1 (slightly vivid than ever before), and 2 (significantly vivid than ever before). It is seen that many viewers sense the uncomfortable feeling when the input signal indicating the red primary color is displayed substantially only by the output from the red laser light source 201R (conditions 6 and 7). As can be seen from the results of the conditions 0, 1, 2, 3, 4, and 5, the uncomfortable feeling is eliminated and the image is suitable for the viewers when the green laser beam and the blue laser beam are added to the light output of the red laser light source 201R such that the total of the laser beam powers from the laser light sources 201G and 201B is greater than or equal to $1/200$ (0.005) of the laser beam power from the red laser light source 201R. As is also seen from the results, as to the chromaticity of the displayed color, when the color is included in the range of $Yr<-1.5Xr+1.35$, the representation of the color formed only by the light having the long wavelength (light having the wavelength of at least 620 nanometers) is eliminated and the uncomfortable feeling is eliminated. As can be seen from the comparison between the conditions 2 and 3, when the power of the blue laser beam is greater than the power of the green laser beam, the viewers easily sense the vivid image. This result leads us to conclude that such representation is preferable for a viewer. When the laser beams other than the red laser beam is excessively added so that the chromaticity of the color actually displayed based on the input signal indicating the red primary color would deviate from the range of $Xr>0.67$ or $Yr<0.31$ (conditions 4 and 5), the viewers tend to hardly sense the displayed color as the vivid representation. Therefore, it is preferable that the display chromaticity of the red primary color exists in the ranges of Xr>0.67 and Yr<0.31.

In the laser image display device 200 of the present embodiment, the integral additive color process in which the outputs are mixed on the image display surface is used as a technique for mixing the light outputs. Alternatively, a time-average additive color process may be used. In the time-average additive color process, in order to display each pixel, the color light beams are rapidly switched to successively mix the color light beams in time line. Further alternatively, a spatial additive color process may also be used. In the spatial additive color process, plural sub-pixels form the one pixel, each of which is for each color.

The laser image display device 200 includes the three spatial light modulation elements. However, as to the modulation method for forming the image, the laser light source power may be modulated using the one spatial light modulation element, or the image may be formed by the laser power modulation and laser scanning. A one-dimensional optical modulation element may be used. An optical modulation element in which color separation is performed may be used.

Although the laser image display device 200 includes three different laser light sources, the invention can be applied to a laser image display device as long as the laser image display device includes at least two laser light sources which can emit the different wavelengths. The invention can also be applied to the laser image display device including at least four laser light sources which can emit the different wavelengths.

The present invention may be applied to the light source which utilizes laser oscillation. In addition to the semiconductor laser, an SHG laser in which wavelength conversion is performed on a gas laser, a solid-state laser, and the like can be used.

The integrator, the illumination optical system, the modulation element, and the projection optical system of the laser image display device of the present invention are not limited to the configurations shown in the embodiment. An optical element which is necessary to display an image may appropriately be used.

The screen (display surface) of the present invention is not limited to the screen for a projection type image display apparatus. The screen (display surface) shall include image display surfaces for any type of image display apparatus.

INDUSTRIAL APPLICABILITY

The laser image display device of the present invention can be used as an apparatus for displaying an image such as a motion picture and a still image with laser light, e.g., a liquid crystal display. The color image display method of the present invention can be used as a color display method used in such apparatus.

The invention claimed is:

1. A laser image display device, comprising:
a first laser light source that emits a first laser beam having a first wavelength;
a second laser light source that emits a second laser beam having a second wavelength; and
a color output conversion controller that controls powers of the first laser beam and the second laser beam based on an input signal, the first and second laser beams displaying a pixel of an image,
wherein:
said color output conversion controller controls the power of the first laser beam which displays the pixel between a first minimum power and a first maximum power;
said color output conversion controller controls the power of the second laser beam which displays the pixel between a second minimum power and a second maximum power; and
when the input signal indicates an end point of a color reproducible region of said laser image display device with respect to display of the pixel, the end point of the color reproducible region being able to be displayed by substantially displaying the first laser beam with the first maximum power and by substantially displaying the second laser beam with the second minimum power,
said color output conversion controller controls the powers of the first and second laser beams such that the pixel is displayed by the first laser beam having a first power less than or equal to the first maximum power and the second laser beam having a second power greater than the second minimum power so that the pixel displays a color that is included in the color reproducible region except for the end point.

2. The laser image display device according to claim 1, further comprising a third laser light source that emits a third laser beam having a third wavelength,
wherein:
the first wavelength ranges from 620 to 700 nanometers;
the second wavelength ranges from 500 to 550 nanometers;
the third wavelength ranges from 430 to 470 nanometers;
said color output conversion controller controls a power of the third laser beam which displays the pixel between a third minimum power and a third maximum power; and
when the input signal indicates an end point of the color reproducible region of said laser image display device with respect to display of the pixel, the end point of the color reproducible region being able to be displayed by substantially displaying the first laser beam with the first maximum power, by substantially displaying the second laser beam with the second minimum power, and by substantially displaying the third laser beam with the third minimum power,
said color output conversion controller controls the powers of the first, second, and third laser beams such that the pixel is displayed by the first laser beam having the first power and at least one of the second laser beam having the second power and the third beam having a third power greater than the third minimum power so that the pixel displays a color that is included in the color reproducible region except for the end point.

3. The laser image display device according to claim 2, wherein,
when the end point of the color reproducible region indicated by the input signal corresponds substantially to a red primary color,
said color output conversion controller controls the powers of the first, second, and third laser beams such that the pixel is displayed by the first laser beam having the first power and at least one of the second laser beam having the second power and the third laser beam having the third power so that the pixel displays a color being formed by additive color mixture that is included in a range of
$Xr > 0.67$,
$Yr < -1.5Xr + 1.35$, and
$Yr < 0.31$ with respect to a chromaticity coordinate $(Xr, Yr)$.

4. The laser image display device according to claim 2, wherein the color output conversion controller controls the powers of the first, second, and third laser beams such that the total power of the second power and the third power displaying the pixel is greater than or equal to $1/200$ of the first power.

5. The laser image display device according to claim 3, wherein the second power is less than the third power.

6. The laser image display device according to claim 2, wherein the color output conversion controller controls at least one of the powers of the first, second, and third laser beams outputted from said first, second, and third laser light sources to control the powers of the first, second, and third laser beams being displayed on the pixel.

7. The laser image display device according to claim 2, further comprising an optical modulation element that modulates at least one of the first, second, and third laser beams,
wherein the color output conversion controller controls said optical modulation element to control at least one of the powers of the first, second, and third laser beams being displayed on the pixel.

8. A method for displaying a color image using a laser image display device, the laser image display device including:
a first laser light source which emits a first laser beam having a first wavelength, the first wavelength being included in a range of 620 to 700 nanometers;
a second laser light source which emits a second laser beam having a second wavelength, the second wavelength being included in a range of 500 to 550 nanometers;
a third laser light source which emits a third laser beam having a third wavelength, the third wavelength being included in a range of 430 to 470 nanometers; and
a color output conversion controller which controls powers of the first, second, and third laser beams based on an input signal, the first, second, and third laser beams displaying a pixel constituting an image,
the color image displaying method comprising:
determining whether or not the input signal indicates that the pixel is to be displayed in red primary color; and
displaying the pixel with the first laser beam having a first power and at least one of the second laser beam having a second power and the third laser beam having a third power if said determining determines that the input signal indicates that the pixel is to be displayed in red primary color,
wherein, in said displaying, a color which is displayed on the pixel is included in a range of
$Xr > 0.67$,
$Yr < -1.5Xr + 1.35$, and
$Yr < 0.31$ with respect to a chromaticity coordinate $(Xr, Yr)$, the color being formed by additive color mixture of the first laser beam having the first power and at least one of the second laser beam having the second power and the third laser beam having the third power.

9. The method according to claim 8, wherein the total power of the second power and the third power is greater than or equal to 1/200 of the first power.

10. The method according to claim 8, wherein the second power is less than the third power.

11. The laser image display device according to claim 3, wherein the color output conversion controller controls the powers of the first, second, and third laser beams such that the total power of the second power and the third power displaying the pixel is greater than or equal to 1/200 of the first power.

* * * * *